United States Patent
Hsieh

(10) Patent No.: US 11,577,495 B1
(45) Date of Patent: Feb. 14, 2023

(54) SELF-ADHERENT WALL DECORATION

(71) Applicant: TAI FIRST CO., Ontario, CA (US)

(72) Inventor: Hank Hsieh, Ontario, CA (US)

(73) Assignee: TAI FIRST CO., Ontario, CA (US)

( * ) Notice: Subject to any disclaimer, the term of this patent is extended or adjusted under 35 U.S.C. 154(b) by 0 days.

(21) Appl. No.: 17/464,670

(22) Filed: Sep. 1, 2021

(51) Int. Cl.
  *B32B 27/08* (2006.01)
  *B32B 27/30* (2006.01)

(52) U.S. Cl.
  CPC ............ *B32B 27/08* (2013.01); *B32B 27/304* (2013.01); *B32B 27/308* (2013.01); *B32B 2255/10* (2013.01); *B32B 2255/26* (2013.01); *B32B 2264/104* (2013.01); *B32B 2264/1022* (2020.08); *B32B 2270/00* (2013.01); *B32B 2307/7265* (2013.01); *B32B 2451/00* (2013.01)

(58) Field of Classification Search
  CPC ..... B32B 27/08; B32B 27/304; B32B 27/308; B32B 2255/10; B32B 2255/26; B32B 2264/1022; B32B 2264/104; B32B 2270/00; B32B 2307/7265; B32B 2451/00
  USPC ............................................. 428/195.1, 212
  See application file for complete search history.

(56) References Cited

U.S. PATENT DOCUMENTS

| | | | | |
|---|---|---|---|---|
| 3,345,234 A | * | 10/1967 | Jecker | D06N 7/0042 428/161 |
| 5,196,246 A | * | 3/1993 | Kauss | C08K 3/013 524/556 |
| 6,214,453 B1 | * | 4/2001 | Kano | D06N 3/0063 428/95 |
| 2006/0204701 A1 | * | 9/2006 | Eichenberger | B32B 27/36 428/40.1 |
| 2018/0111360 A1 | * | 4/2018 | Xiao | B32B 37/144 |

FOREIGN PATENT DOCUMENTS

WO  WO-2018030606 A1 *  2/2018  ............ B32B 27/06

* cited by examiner

*Primary Examiner* — Tamra L. Dicus
(74) *Attorney, Agent, or Firm* — Pai Patent & Trademark Law Firm; Chao-Chang David Pai

(57) ABSTRACT

A self-adherent wall decoration has a body and two adhesive strips. The body is flexible and has a wear layer, a vinyl print layer, a waterproof core layer, and an underlayment layer. The wear layer is composed of poly(vinyl chloride), acrylate copolymer, dioctyl terephthalate, organotin thermal stabilizers, etc. The vinyl print layer is formed on the wear layer, and is composed of poly(vinyl chloride), acrylate copolymer, etc. The waterproof core layer is formed on the vinyl print layer, and is composed of poly(vinyl chloride), acrylonitrile-butadiene-styrene copolymer, etc. The underlayment layer is a poly(vinyl chloride) film, and is formed on the waterproof core layer. The two adhesive strips are adhered to a side of the underlayment layer of the body away from the waterproof core layer, wherein each one of the two adhesive strips is located near a respective one of two parallel sides of the body.

14 Claims, 8 Drawing Sheets

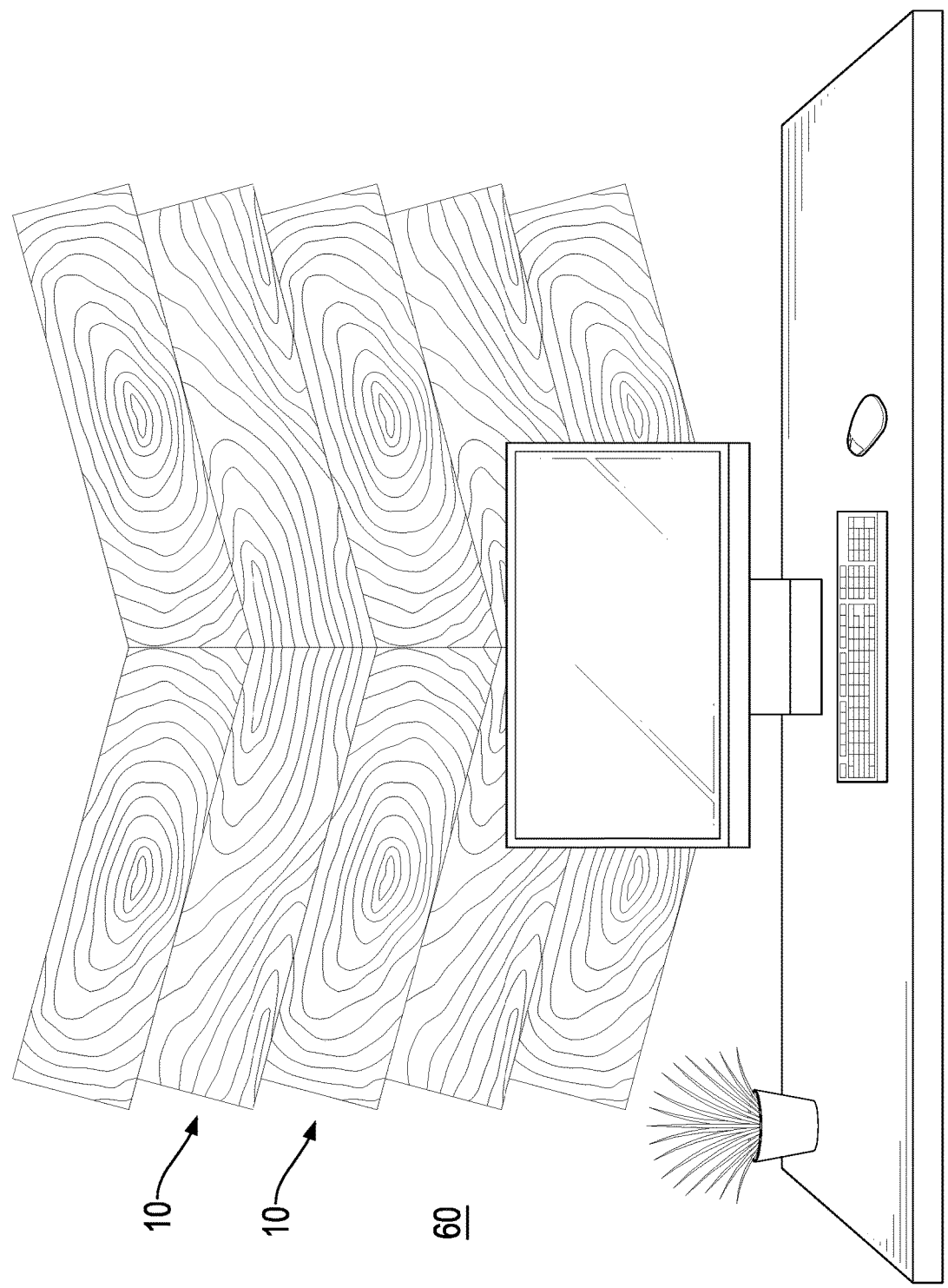

SELF-ADHERENT WALL DECORATION

BACKGROUND OF THE INVENTION

1. Field of the Invention

The present invention relates to a multilayered structure producing decorative effects, and more particularly relates to a self-adherent wall decoration.

2. Description of Related Art

A conventional wall paper is used as wall decoration. For aesthetic purposes, the conventional wall paper is generally printed with colors and/or patterns, and is generally cut into pieces of large sizes to cover a broad area of a wall in a room.

When in use, a backside of the conventional wall paper or the wall is firstly coated with glue, wherein the glue is coated evenly on the backside of the conventional wall paper or on the wall, and the glue helps the conventional wall paper to adhere onto the wall. After the gluing and pasting, the conventional wall paper can provide an aesthetic appearance in the room.

However, the conventional wall paper has the following shortcomings.

1. For a special decoration in a partial area of the wall, the conventional wall paper has to be cut into pieces of a smaller size.

2. The conventional wall paper fails to present a look of heavy textures or to provide a creative layout of appearance under suitable arrangements, and thus lacks versatility of furnishing.

3. The glue is squeezed out from edges of the conventional wall paper very often when the conventional wall paper is pasted on the wall.

4. The conventional wall paper needs to be very light in weight in order to be stuck onto the wall and can only be pasted on a smooth and flat wall.

SUMMARY OF THE INVENTION

The main objective of the present invention is to provide a self-adherent wall decoration that solves the difficulty in use due to sizes, incapability of presenting three-dimensional appearances and creative layouts, spillover of glue of the conventional wall paper, limitation of light weight on the products, and limitation of the wall texture which can be applied.

The self-adherent wall decoration in accordance with the present invention comprises a body and two adhesive strips. The body is flexible and has four sides, a wear layer, a vinyl print layer, a waterproof core layer, and an underlayment layer. The four sides include two parallel sides that are equal to or longer than the rest of the four sides. The wear layer is composed of poly(vinyl chloride), acrylate copolymer, dioctyl terephthalate, organotin thermal stabilizers, calcium carbonate, titanium dioxide, and pigment. The vinyl print layer is formed on a side of the wear layer, and is composed of poly(vinyl chloride), acrylate copolymer, dioctyl terephthalate, calcium carbonate, and pigment. The waterproof core layer is formed on a side of the vinyl print layer away from the wear layer, and is composed of poly(vinyl chloride), acrylonitrile-butadiene-styrene copolymer, dioctyl terephthalate, calcium carbonate, antioxidants, and stearic acid salt. The underlayment layer is a poly(vinyl chloride) film, and is formed on a side of the waterproof core layer away from the vinyl print layer. The two adhesive strips are adhered to a side of the underlayment layer of the body away from the waterproof core layer, wherein each one of the two adhesive strips is located near a respective one of the two parallel sides.

Other objectives, advantages and novel features of the invention will become more apparent from the following detailed description when taken in conjunction with the accompanying drawings.

BRIEF DESCRIPTION OF THE DRAWINGS

FIGS. 5 to 8 are operational views of the self-adherent wall decoration in FIG. 1.

DETAILED DESCRIPTION OF THE PREFERRED EMBODIMENT

Figure 1:
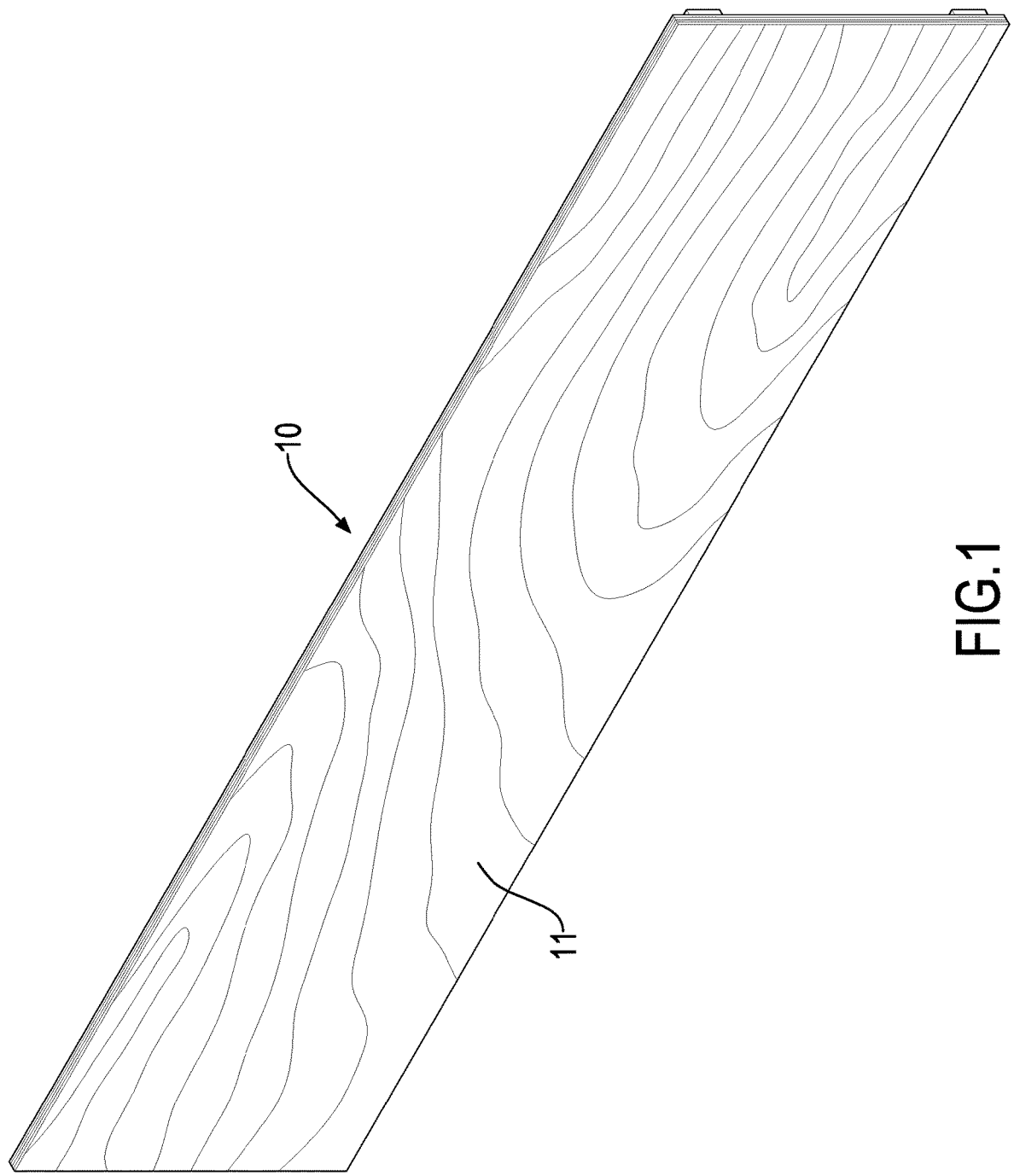
FIG. 1 is a perspective view of a self-adherent wall decoration in accordance with the present invention.
Figure 2:
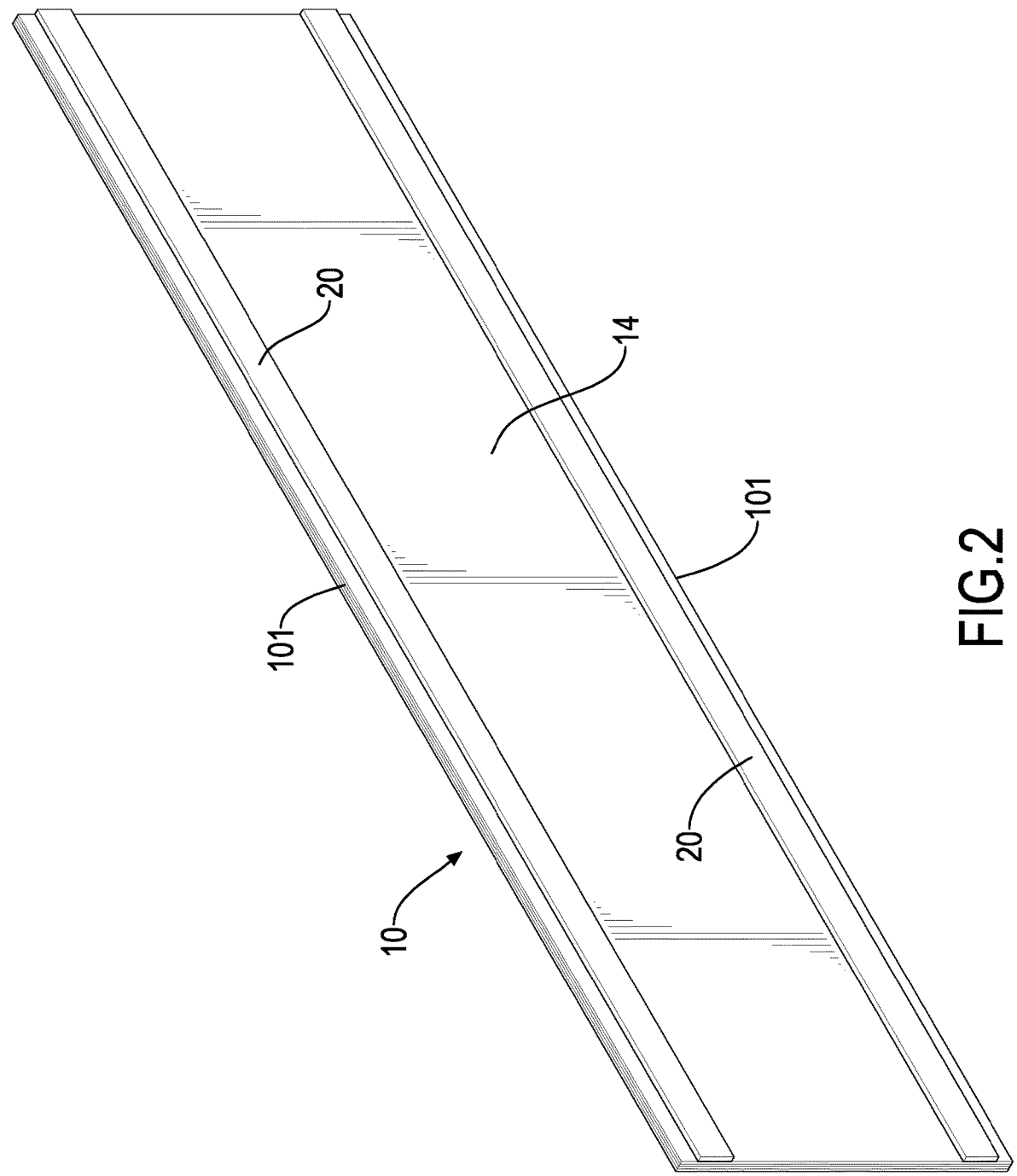
FIG. 2 is another perspective view of the self-adherent wall decoration in FIG. 1.
Figure 3:
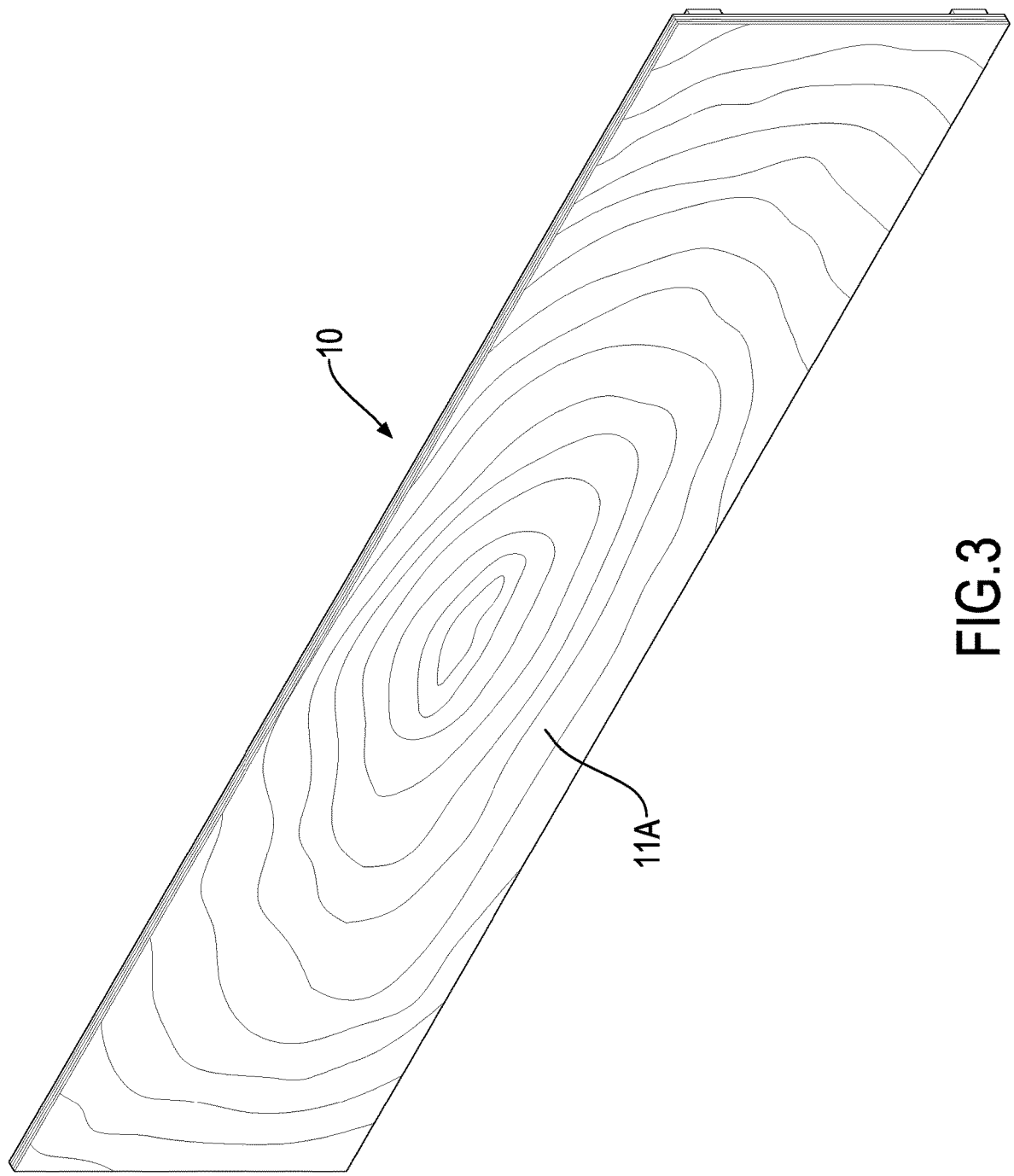
FIG. 3 is a perspective view of another self-adherent wall decoration having a different surface pattern from the self-adherent wall decoration in FIG. 1.
Figure 4:
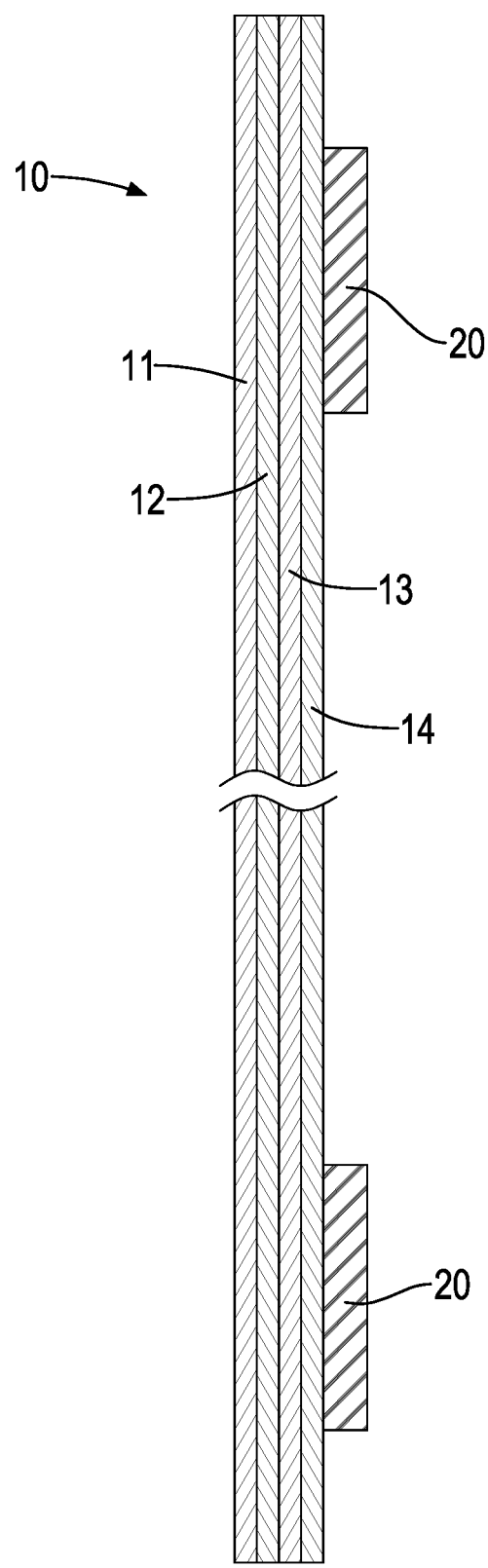
FIG. 4 is a cross sectional side view of the self-adherent wall decoration in FIG. 1.

With reference to FIGS. 1 to 4, the self-adherent wall decoration comprises a body 10 and two adhesive strips 20. The body 10 has four sides, a wear layer 11, a vinyl print layer 12, a waterproof core layer 13, and an underlayment layer 14. Specifically, the self-adherent wall decoration is a wall panel.

The four sides of the body 10 include two parallel sides 101 that are equal to or longer than the rest of the four sides. The wear layer 11 is composed of 73 weight percent (wt %) of poly(vinyl chloride) and acrylate copolymer, 18 wt % of dioctyl terephthalate and organotin thermal stabilizers, 6 wt % of calcium carbonate, and 3 wt % of titanium dioxide and pigment. The wear layer 11 provides a protective effect to prevent the self-adherent wall decoration from being easily scarred. Moreover, the wear layer 11 is transparent.

The vinyl print layer 12 is formed on a side of the wear layer 11, and is composed of 70 wt % of poly(vinyl chloride) and acrylate copolymer, 20 wt % of dioctyl terephthalate, 5 wt % of calcium carbonate, and 5 wt % of pigment. In the present invention, with reference to FIGS. 1 and 3, the vinyl print layers 12 of different pieces of the self-adherent wall decoration have different growth ring patterns thereon, presenting wood-like textures.

The waterproof core layer 13 is formed on a side of the vinyl print layer 12 away from the wear layer 11, and is composed of 22 wt % of poly(vinyl chloride), 10 wt % of acrylonitrile-butadiene-styrene copolymer, 20 wt % of dioctyl terephthalate, 40 wt % of calcium carbonate, and 8 wt % of antioxidants and stearic acid salt. The waterproof core layer 13 provides a waterproof effect for the self-adherent wall decoration. The underlayment layer 14 is a poly(vinyl chloride) film, and is formed on a side of the waterproof core layer 13 away from the vinyl print layer 12.

The two adhesive strips 20 are adhered to a side of the underlayment layer 14 of the body 10 away from the waterproof core layer 13, wherein each one of the two adhesive strips 20 is located near a respective one of the two parallel sides 101 of the body 10. In such configurations, a user may spread the body 10, set the body 10 to a location on a wall, and press to paste the body 10 onto the wall through the two adhesive strips 20. In this way, the user does not have to coat the body 10 with glue evenly, and spillover of glue would not happen. Each one of the two adhesive strips 20 is a transparent pressure-sensitive tape, and has a thickness between 0.3-3 millimeters (mm) Furthermore, the thickness of each adhesive strip 20 is preferred to be 0.5-1.5 mm.

The user may prepare multiple pieces of the self-adherent wall decoration, and paste them on the wall, so the multiple pieces of the self-adherent wall decoration may serve as the conventional wall paper that fully cover the wall. Because the two adhesive strips 20 have fluidity, adhesive composition of the adhesive strip 20 can permeate into an uneven textured surface of the wall, and the self-adherent wall decoration is thereby firmly stuck onto the wall.

Figure 5:
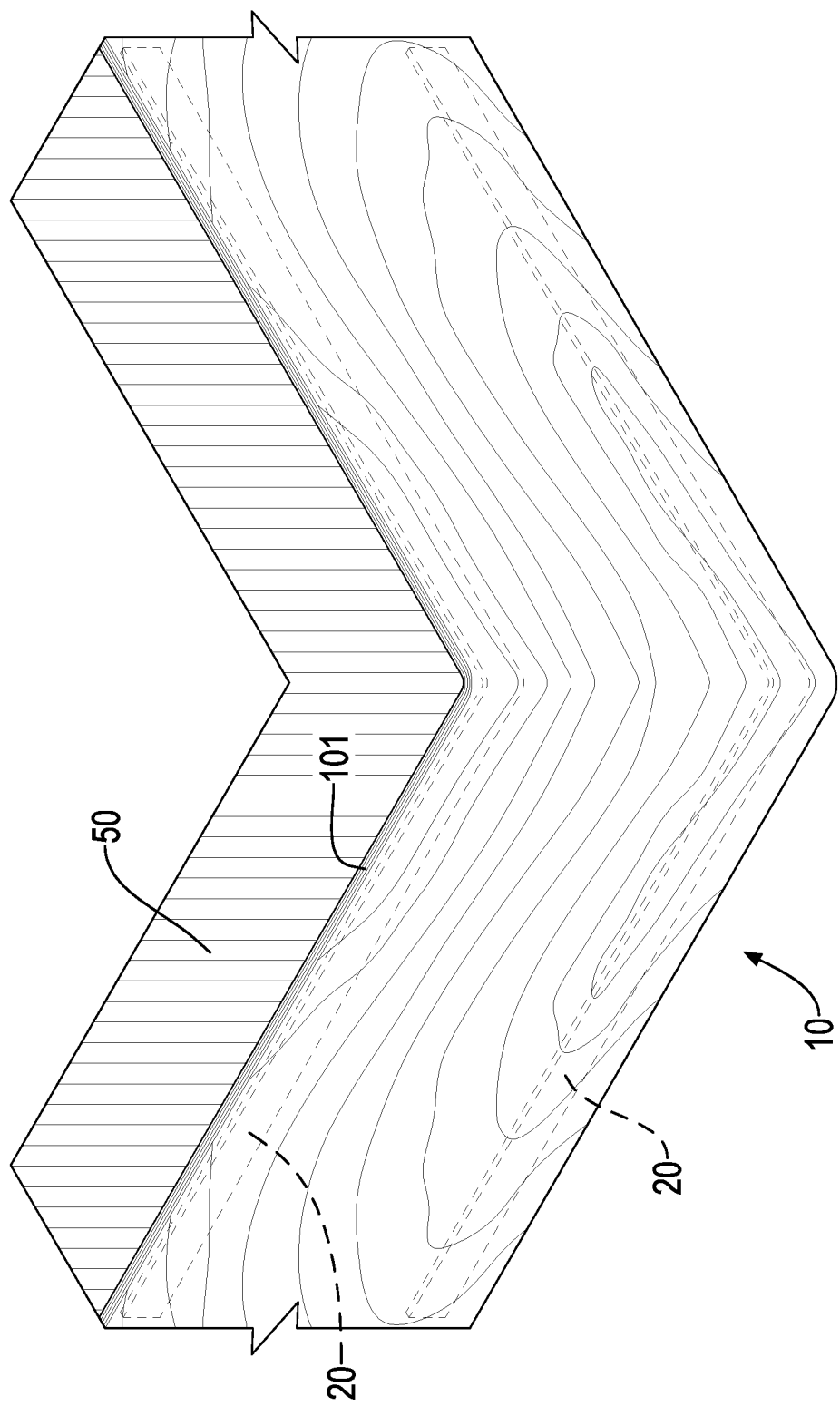

Moreover, with reference to FIG. 5, due to the compositions of the wear layer 11, the vinyl print layer 12, the waterproof core layer 13, and the underlayment layer 14, the body 10 is flexible, and can be well pasted on a curved wall 50.

Figure 6:
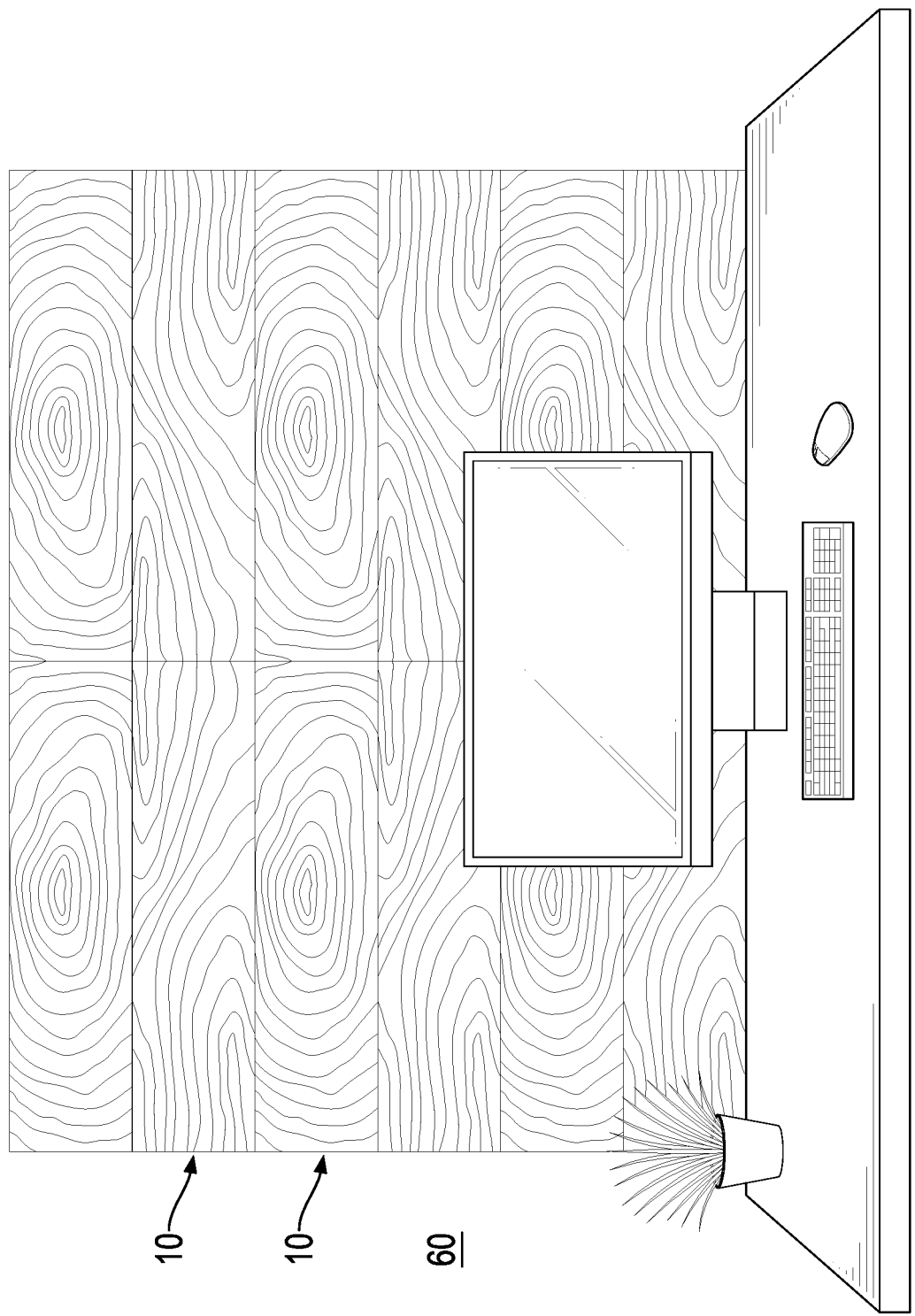
Figure 7:
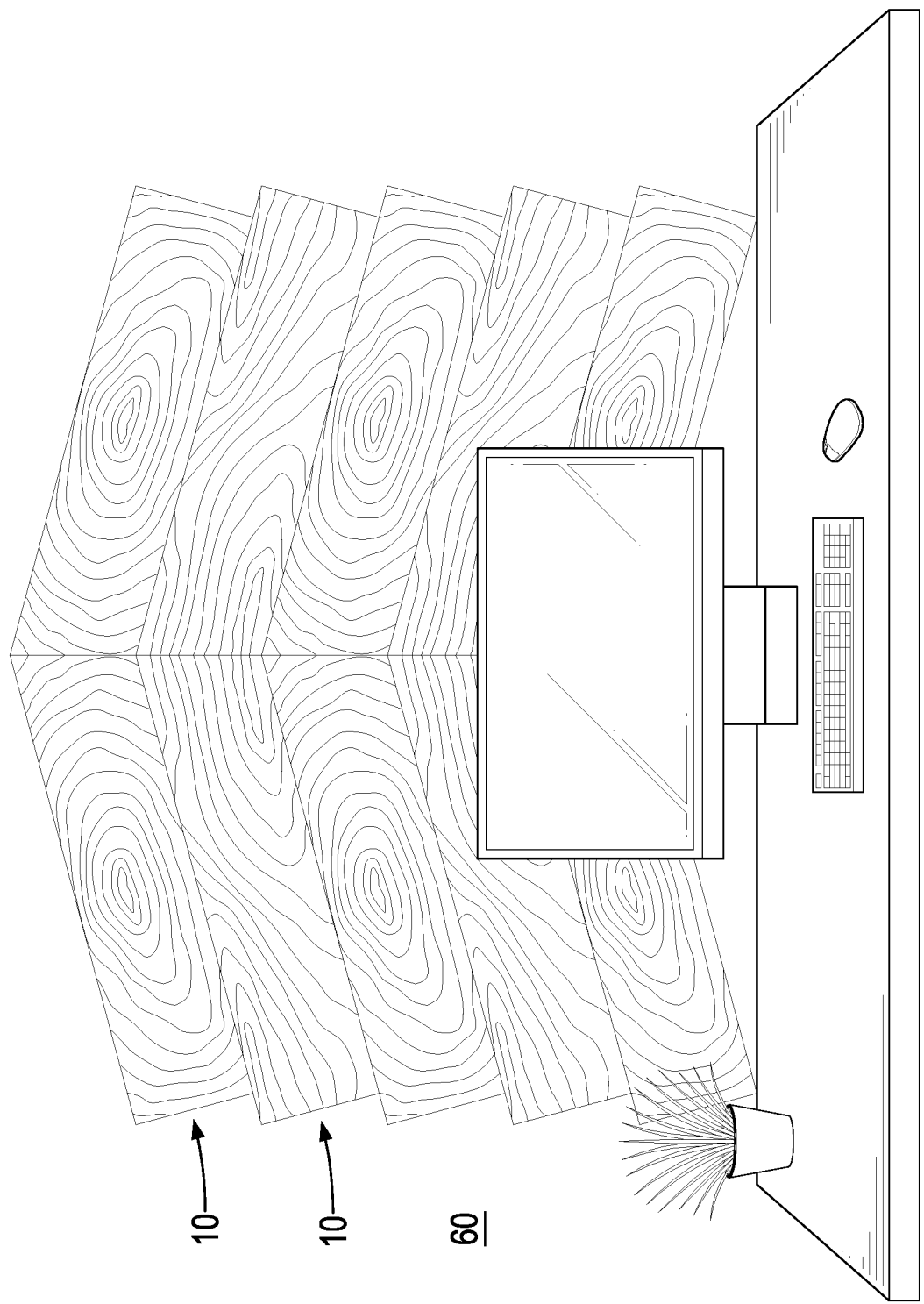

With reference to FIGS. 6 to 8, the user may arrange several pieces of the self-adherent wall decoration into a special pattern, and paste them on a small area of the wall 60. Since the several pieces of the self-adherent wall do not fully cover the wall 60, they may provide a three-dimensional appearance with heavy textures and weight.

With the aforementioned technical features, the self-adherent wall decoration of the present invention has the following advantages.

1. The usage amount of the pieces of the self-adherent wall decoration is decided by the user, so the user may design how to paste and how many of the pieces of the self-adherent wall decoration to be pasted onto the wall 50, 60.

2. Since each piece of the self-adherent wall decoration comprises multiple layers, i.e. the wear layer 11, the vinyl print layer 12, the waterproof core layer 13, and the underlayment layer 14, the self-adherent wall decoration has a thickness. Hence a single piece or a few pieces of the self-adherent wall decoration will provide a three-dimensional appearance, and may provide a look of heavy textures as a special aesthetic improvement.

3. Spillover of glue is absolutely avoided.

4. The intrinsic characteristics of the two adhesive strips 20 make the two adhesive strips 20 able to fit on the textured surface of the wall, for example, an orange peel wall. The two adhesive strips 20 can be pasted firmly on walls of different material, e.g., a granite wall, a quartz wall, a plastic wall, a stucco wall, a drywall, etc. Hence, compared to the conventional products, the self-adherent wall decoration has convenience for operation, good viscosity, and can be pasted on the uneven wall firmly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-adherent wall decoration comprising:
   a body being flexible and having
      four sides including two parallel sides that are equal to or longer than the rest of the four sides;
      a wear layer composed of poly(vinyl chloride), acrylate copolymer, dioctyl terephthalate, organotin thermal stabilizers, calcium carbonate, titanium dioxide, and pigment;
      a vinyl print layer formed on a side of the wear layer and composed of poly(vinyl chloride), acrylate copolymer, dioctyl terephthalate, calcium carbonate, and pigment;
      a waterproof core layer formed on a side of the vinyl print layer away from the wear layer and composed of poly(vinyl chloride), acrylonitrile-butadiene-styrene copolymer, dioctyl terephthalate, calcium carbonate, antioxidants, and stearic acid salt; and
      an underlayment layer being a poly(vinyl chloride) film and formed on a side of the waterproof core layer away from the vinyl print layer; and
   two adhesive strips adhered to a side of the underlayment layer of the body away from the waterproof core layer, wherein each one of the two adhesive strips is located near a respective one of the two parallel sides of the body;
   wherein the wear layer is composed of 73 weight percent (wt %) of poly(vinyl chloride) and acrylate copolymer, 18 wt % of dioctyl terephthalate and said organotin thermal stabilizers, 6 wt % of calcium carbonate, and 3 wt % of titanium dioxide and pigment.

2. A self-adherent wall decoration comprising:
   a body being flexible and having
      four sides including two parallel sides that are equal to or longer than the rest of the four sides;
      a wear layer composed of poly(vinyl chloride), acrylate copolymer, dioctyl terephthalate, organotin thermal stabilizers, calcium carbonate, titanium dioxide, and pigment;
      a vinyl print layer formed on a side of the wear layer and composed of poly(vinyl chloride), acrylate copolymer, dioctyl terephthalate, calcium carbonate, and pigment;
      a waterproof core layer formed on a side of the vinyl print layer away from the wear layer and composed of poly(vinyl chloride), acrylonitrile-butadiene-styrene copolymer, dioctyl terephthalate, calcium carbonate, antioxidants, and stearic acid salt; and
      an underlayment layer being a poly(vinyl chloride) film and formed on a side of the waterproof core layer away from the vinyl print layer; and
   two adhesive strips adhered to a side of the underlayment layer of the body away from the waterproof core layer, wherein each one of the two adhesive strips is located near a respective one of the two parallel sides of the body;
   wherein the vinyl print layer is composed of 70 wt % of poly(vinyl chloride) and acrylate copolymer, 20 wt % of dioctyl terephthalate, 5 wt % of calcium carbonate, and 5 wt % of pigment.

3. The self-adherent wall decoration as claimed in claim 1, wherein the vinyl print layer is composed of 70 wt % of poly(vinyl chloride) and acrylate copolymer, 20 wt % of dioctyl terephthalate, 5 wt % of calcium carbonate, and 5 wt % of pigment.

4. A self-adherent wall decoration comprising:
   a body being flexible and having
      four sides including two parallel sides that are equal to or longer than the rest of the four sides;

a wear layer composed of poly(vinyl chloride), acrylate copolymer, dioctyl terephthalate, organotin thermal stabilizers, calcium carbonate, titanium dioxide, and pigment;

a vinyl print layer formed on a side of the wear layer and composed of poly(vinyl chloride), acrylate copolymer, dioctyl terephthalate, calcium carbonate, and pigment;

a waterproof core layer formed on a side of the vinyl print layer away from the wear layer and composed of poly(vinyl chloride), acrylonitrile-butadiene-styrene copolymer, dioctyl terephthalate, calcium carbonate, antioxidants, and stearic acid salt; and an underlayment layer being a poly(vinyl chloride) film and formed on a side of the waterproof core layer away from the vinyl print layer; and two adhesive strips adhered to a side of the underlayment layer of the body away from the waterproof core layer, wherein each one of the two adhesive strips is located near a respective one of the two parallel sides of the body;

wherein the waterproof core layer is composed of 22 wt % of poly(vinyl chloride), 10 wt % of acrylonitrile-butadiene-styrene copolymer, 20 wt % of dioctyl terephthalate, 40 wt % of calcium carbonate, and 8 wt % of said antioxidants and stearic acid salt.

5. The self-adherent wall decoration as claimed in claim 1, wherein the waterproof core layer is composed of 22 wt % of poly(vinyl chloride), 10 wt % of acrylonitrile-butadiene-styrene copolymer, 20 wt % of dioctyl terephthalate, 40 wt % of calcium carbonate, and 8 wt % of said antioxidants and stearic acid salt.

6. The self-adherent wall decoration as claimed in claim 2, wherein the waterproof core layer is composed of 22 wt % of poly(vinyl chloride), 10 wt % of acrylonitrile-butadiene-styrene copolymer, 20 wt % of dioctyl terephthalate, 40 wt % of calcium carbonate, and 8 wt % of said antioxidants and stearic acid salt.

7. The self-adherent wall decoration as claimed in claim 3, wherein the waterproof core layer is composed of 22 wt % of poly(vinyl chloride), 10 wt % of acrylonitrile-butadiene-styrene copolymer, 20 wt % of dioctyl terephthalate, 40 wt % of calcium carbonate, and 8 wt % of said antioxidants and stearic acid salt.

8. The self-adherent wall decoration as claimed in claim 1, wherein each one of the two adhesive strips is made of a transparent material, and has a thickness of 0.3-3 mm.

9. The self-adherent wall decoration as claimed in claim 2, wherein each one of the two adhesive strips is made of a transparent material, and has a thickness of 0.3-3 mm.

10. The self-adherent wall decoration as claimed in claim 3, wherein each one of the two adhesive strips is made of a transparent material, and has a thickness of 0.3-3 mm.

11. The self-adherent wall decoration as claimed in claim 4, wherein each one of the two adhesive strips is made of a transparent material, and has a thickness of 0.3-3 mm.

12. The self-adherent wall decoration as claimed in claim 5, wherein each one of the two adhesive strips is made of a transparent material, and has a thickness of 0.3-3 mm.

13. The self-adherent wall decoration as claimed in claim 6, wherein each one of the two adhesive strips is made of a transparent material, and has a thickness of 0.3-3 mm.

14. The self-adherent wall decoration as claimed in claim 7, wherein each one of the two adhesive strips is made of a transparent material, and has a thickness of 0.3-3 mm.

* * * * *